2,935,082
ANTI-SYPHON VALVE FOR COMMODE TANKS

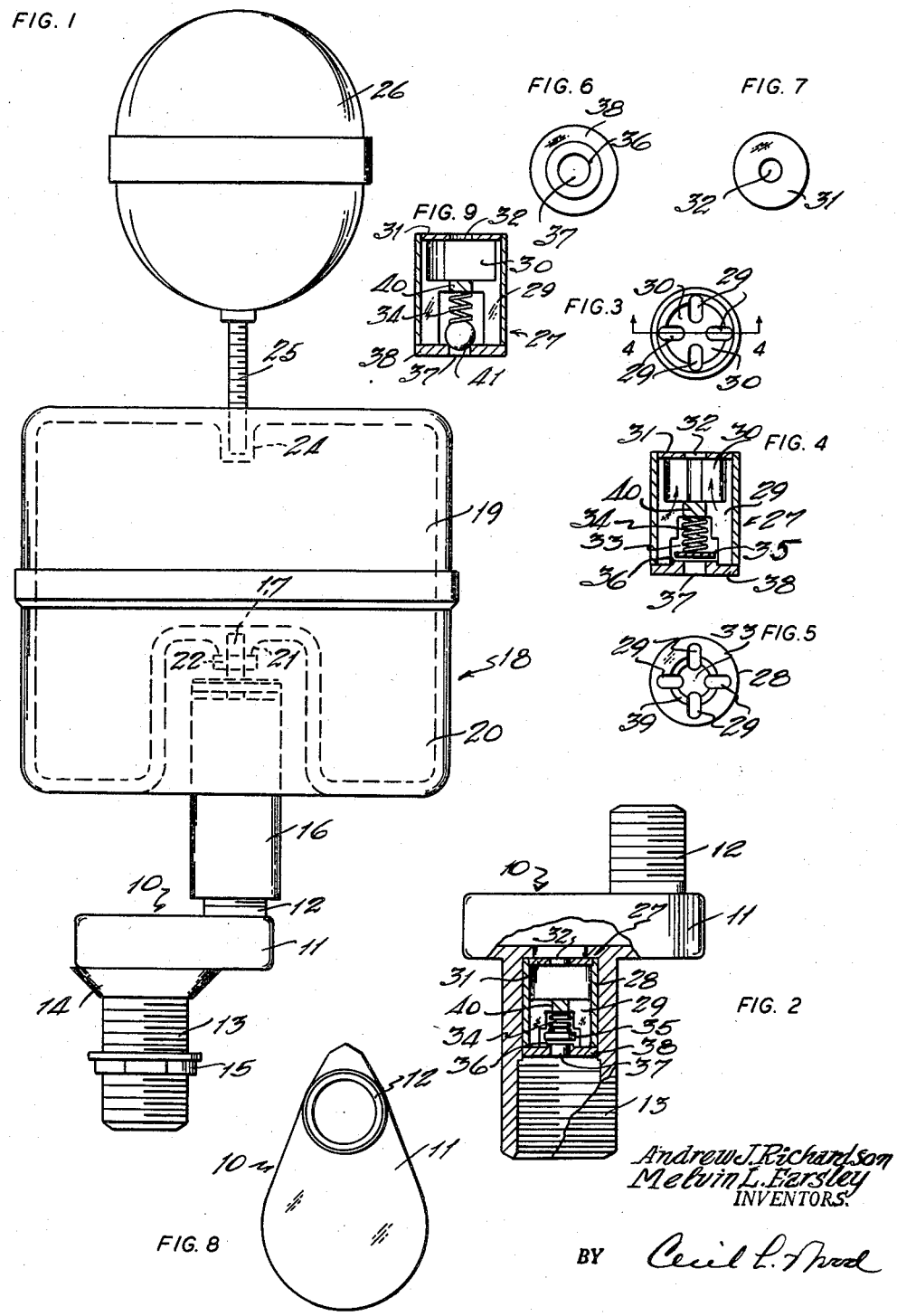

Andrew J. Richardson and Melvin L. Earsley,
Lubbock, Tex.

Application August 18, 1954, Serial No. 450,569

1 Claim. (Cl. 137—454.2)

This invention relates to float controlled valves for commode tanks, and the like, and particularly to the type of flow control valve which is capable of minimizing the turbulence and noise usually attendant upon the filling of commode tanks, and the principal object of the invention resides in the provision of a valve of the character described which comprises a minimum of operating parts and embodies features of construction which will minimize or completely eliminate the hazard of any syphoning of the contents of a commode tank into the supply line when or if the same has been broken through accident or when the supply is interrupted for any cause.

It is an object of the invention to provide a check valve of simple and economical design which can be easily installed in the inlet fitting in the bottom of the flush tank, and between the tank and the supply pipe attached thereto, whereby to prevent the contents of the tank from returning through the inlet fitting to the supply line to carry thereinto any contamination present in the water contained in the tank.

While the foregoing objects are paramount, other and lesser objects will become manifest as the description proceeds, taken in connection with the appended drawings wherein:

Figure 1 illustrates, in elevation, a typical structure embodying the invention, showing the universal fitting installable in the bottom of a tank, and the closed weighted receptacle.

Figure 2 is a detail view of the universal fitting, shown partially in section to illustrate the anti-syphon valve, also shown in section, installed in the inlet shank thereof.

Figure 3 is a plan view of the anti-syphon check valve showing the water passages therethrough.

Figure 4 is a longitudinal sectional view of the anti-syphon valve showing the spring actuated disk closure, and illustrating the water passages therethrough, on lines 4—4 of Figure 3.

Figure 5 is an inverted plan view of the anti-syphon check valve with the seat removed.

Figure 6 is a plan view of the seat and bottom closure for the structure shown in Figures 3, 4 and 5.

Figure 7 is a top plan view of the upper plate closing the top of the valve shown in Figures 3, 4 and 5, in which a flow port is provided.

Figure 8 is a plan view of the universal fitting in which the anti-syphon valve is installed, and Figure 9 is a longitudinal sectional view of a modified valve in which a ball closure is provided instead of the disk shown in Figure 4.

While the invention is primarily concerned with certain elements which will manifest themselves as the description proceeds, the structure disclosed herein comprises a fitting 10 which has a body portion 11 and offset shanks 12 and 13, both of which are exteriorly threaded and respectively extend upwardly from the body 11 into the tank (not shown) and through the bottom thereof to which a supply pipe can be attached, a packing ring 14 being arranged thereon to seal the bottom of the tank and a nut 15 is provided on the shank 13 for securing the same.

To the shank 12 is threaded a tubular flow tube 16, of plastic, or the like, having a stem 17 operating concentrically thereof for closing off the water flow through the tube 16, the upper end of the stem 17 being shown in dotted lines in Figure 1. Attached to the upper end of the stem 17 is a closed receptacle 18, shown formed in upper and lower joined sections 19 and 20 and sealed. A boss 21 is formed in the bottom of the receptacle to threadedly receive the upper end of the stem 17 which is secured by a locknut 22 in a dome-like recess formed in the bottom of the member 18, as shown in dotted lines in Figure 1. In the top of the receptacle 18 is formed another boss 24 into which is threaded a stem 25 which has a float 26 threaded upon its upper end.

In Figure 2 the fitting 10 is illustrated in detail, the shank 13 being shown in longitudinal section to illustrate the position of a check valve generally designated by the numeral 27 which has a cylindrical body 28 formed of plastic, or similar materials, with passages 29 and a chamber 30 formed therein. The chamber 30 is closed by a disk 31 which has an aperture 32 centrally thereof, as shown in Figures 4 and 7, and a chamber 33 is provided in the lower portion of the body 28, as depicted in Figures 4 and 5, in which is arranged a coil spring 34 which bears against a disk 35 of rubber, or similar material, which engages an annular seat 36 about an orifice 37 in a disk 38, the seat 36 conformably engaging a circular recess 39 in the bottom of the member 28, as shown in Figure 4. The spring 34 bears against a web 40 formed centrally of the body 28.

The modified form of the check valve 27, illustrated in Figure 9, embodies a construction similar to that shown elsewhere in the drawings but has a ball closure 41 for closing the seat orifice 37. Such an arrangement will function in the same manner as the device shown in Figures 2 and 4.

In operation, the anti-syphon valve shown in Figures 2 and 4, when installed in the fitting 10 as illustrated in Figure 2, will enable water to flow into the tank from the supply pipe, which is connected to the shank 13, but will prevent backflow into the supply line in the event the latter is shut off for any purpose, or is accidently broken or interrupted so that the water flow is reversed, or when a syphoning action is produced by the reverse flow of water in a supply line.

While it is not generally true that water in a commode tank is contaminated in any manner, it is highly possible that by some reason impurities can enter the tank in isolated cases to seriously contaminate the supply for an entire locality and in many municipalities there are ordinances which require that adequate means be provided to prevent the back-flow of water from commode tanks into water lines used for human consumption.

The invention is intended as a reliable means for protecting the public in instances where contamination from commode flush tanks is possible, and the structure herein shown and described, when utilized with any of the conventional types of inflow valves now available, is capable of meeting the required standards.

What is claimed is:

A unitary valved inlet fitting for commode tanks comprising an elongated casing providing a chamber therein, said casing having at least one exterior planar surface, a threaded inlet nipple projecting outwardly and perpendicularly from one end of said planar surface and communicating with said chamber and a threaded outlet nipple projecting in parallel relationship with said inlet nipple from the side of the casing opposite said planar surface and at a point located on the end of said casing remote from said inlet nipple, a cylindrical housing telescoped within the bore of the inlet nipple, said housing having inlet and outlet openings arranged coaxially of said bore, said inlet opening communicating with the free end of the inlet nipple, a spring pressed check valve in said housing urged in closed relation with said inlet opening to control flow through said inlet nipple into said chamber.

References Cited in the file of this patent

UNITED STATES PATENTS

| | | |
|---|---|---|
| 1,770,909 | Brooks | July 22, 1930 |
| 1,796,455 | Gunn | Mar. 17, 1931 |
| 1,938,418 | Evans | Dec. 5, 1933 |
| 2,271,419 | Egan | Jan. 27, 1942 |
| 2,290,145 | Owens | July 14, 1942 |
| 2,415,875 | Greenwald | Feb. 18, 1947 |
| 2,495,542 | Panton | Jan. 24, 1950 |
| 2,585,773 | Hartman | Feb. 12, 1952 |
| 2,678,058 | Richardson | May 11, 1954 |
| 2,797,704 | McDermott | July 2, 1957 |